United States Patent Office 3,201,925
Patented Aug. 24, 1965

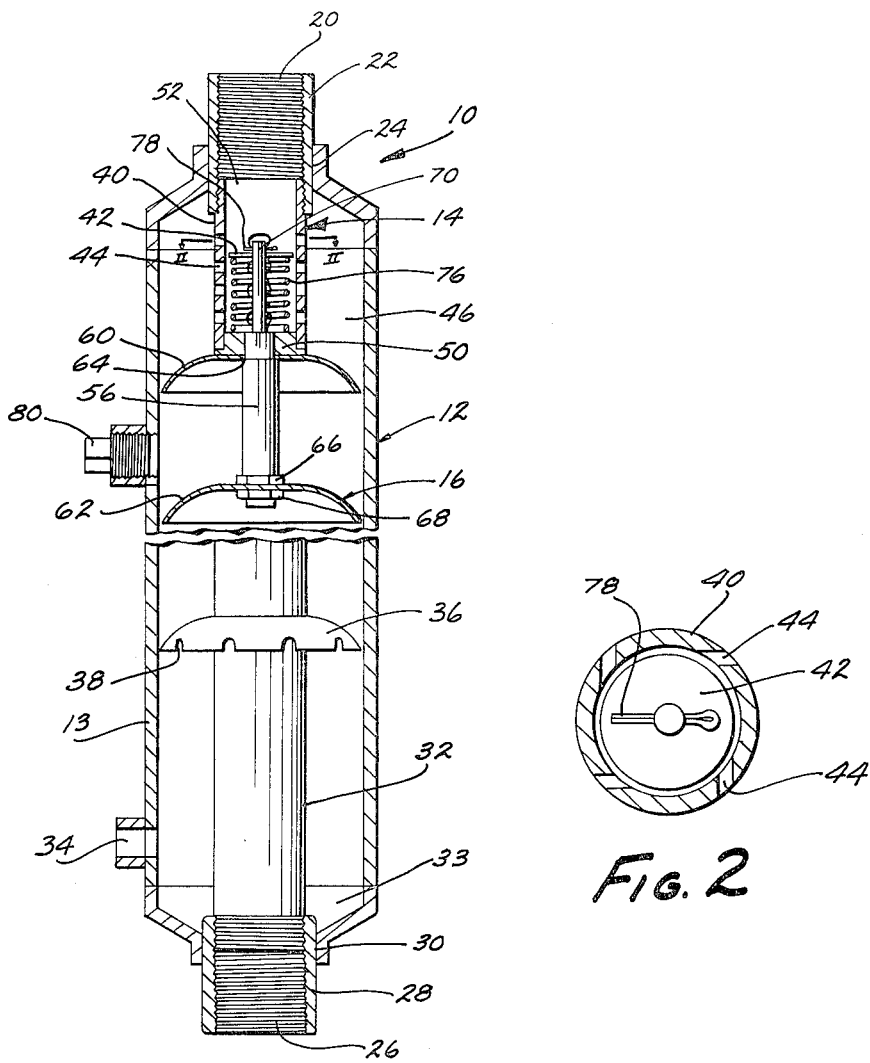

3,201,925
VARIABLE FLOW SEPARATOR
Joseph J. Shada, Memphis, Tenn., assignor to International Basic Economy Corporation, New York, N.Y., a corporation of New York
Filed Aug. 17, 1961, Ser. No. 132,187
5 Claims. (Cl. 55—391)

This invention relates to separators for removing impurities from gases, and more particularly to a variable flow separator having effective separation characteristics regardless of the gaseous volumetric flow rate therethrough.

Centrifugal separators for compressed, flowing gaseous materials, e.g., air, to remove impurities such as water and dust are ordinarily manufactured in an assorted array of capacities to accommodate different gaseous flow rates. This is ordinarily necessary because the flow velocity through a centrifugal separator must be maintained above a certain minimum to cause the impurities to be thrown out of the flowing gas, and because the gas velocity through the separator must be maintained below a certain maximum to prevent undue turbulence tending to carry the impurities clear through the separator. In many instances, however, the volumetric flow rate through an air line and a separator will vary widely in response to a varying demand, for example, to a motor. The conventional separators are therefore effective in such an application only over a narrow range of the widely varying flow rate. When the flow rate rises above or falls below this effective range, poor separation results.

Further, even if the volumetric flow rate through a line is relatively constant, the expense of manufacturing and maintaining a complete assorted line of separators for individual lines involving many different flow rates is relatively costly.

It is an object of this invention to provide a relatively simple, gaseous separator which effectively cleans gas of impurities even where the volumetric flow rate varies widely. The separator further abrogates the usual necessity of an array of variable capacity separators for lines involving different flow rates since the one separator will serve in place of any of the others.

It is another object of this invention to provide a variable flow separator having an integral flow regulator that maintains the velocity of gases passing through the centrifugal separator within an optimum range regardless of the varying gas velocity entering the separator due to varying volumetric flow rates. The regulator is automatically responsive to varying flow rates to effect the proper velocity change. It includes a minimum of moving parts and it operates very dependably.

It is capable of being manufactured by adding a few relatively inexpensive parts to a conventional separator. The regulator includes valving means movable against a biasing force according to the dynamic pressure of the gas entering, and includes a variable porting means governed by the valving means to regulate the gas velocity into the centrifugal separator. The valve means is not susceptible to misalignment, and thus assures dependable operation.

Other objects and advantages of this invention will be apparent upon studying the following specification in conjunction with the drawings in which:

FIG. 1 is a front elevational sectional view of the novel separator; and

FIG. 2 is a cross-sectional view taken along the plane II—II of FIG. 1.

Basically, this invention comprises a variable flow gaseous separator including regulator means responsive to the dynamic pressure of the flowing gas-impurity mixture to govern the velocity of this mixture as it flows to the centrifugal separator means. The regulator comprises a ported tubular element having an opening communicating with the housing inlet means, and a valve means reciprocal in said element. The porting means in the tubular element has a variable flow cross section controlled by the valve means. These ports are arranged in the wall of this element and oriented generally tangentially to the inner periphery thereof to impart a generally circular flow pattern to the gas for centrifugal separation of impurities. The valving means is biased toward the inlet means to cause the variable porting to increase only with increased gaseous flow rate.

Referring to FIG. 1, the separator 10 includes housing 12, regulator means 14, and baffle means 16.

Housing 12 includes inlet means 20 for the impurity-carrying gases. This inlet 20 may be formed with a suitable pipe coupling 22 secured in opening 24 at the upper end of the elongated, generally cylindrical housing. Outlet 26 is formed by a second pipe coupling 28 secured in opening 30 at the opposite or lower end of the elongated housing 12. Extending upwardly from the outlet 26 is a suitable conduit 32 through which the gas flows to the outlet, and around the outside of which the separated impurities such as water collect. The water may then pass out drain opening 34 adjacent the bottom of the housing. One or more conventional retaining baffles 36 having openings 38 therein for downward passage of water droplets is secured tightly around this conduit 32.

Threadably connected into the lower portion of inlet coupling 22 is a regulator means 14 including a tubular and preferably cylindrical element 40, and a valving member 42 reciprocable in the element. A plurality of ports 44 are arranged around the periphery and through the wall of cylindrical element 40 to allow gaseous flow from the inlet 20 into the main portion 46 of the housing. Each of these ports is oriented generally tangentially with respect to the inner peripheral surface of element 40 (FIG. 2) to initiate the circular action which causes separation of heavier-than-air impurities by centrifugal force. Plug 50 is mounted in the lower end of element 40, e.g. by a press fit. Upper end 52 of element 40 is open to communicate with the inlet means 20. Attached to the bottom of plug 50 is a mounting rod 56 threadably connected to or press fit into plug 50 to support a plurality (here two) of conventional flow baffles 60 and 62. Baffle 60 is retained against plug 50 by shoulder 64. Baffle 62 is retained on the rod by a pair of suitable nuts 66 and 68. Extending upwardly from plug 50 (here mounted in the butt of rod 56) is a guide pin 70. The disc-type, valving member 42 is guided on this pin during reciprocation to prevent misalignment, and maintain frictional contact to a minimum. A biasing means such as coil spring 76 extends between plug 50 and valve 42 to bias the latter toward the inlet means 20. A stop, such as cotter key 78 extending through guide pin 70, determines the upward limit of valve 42. Preferably, the topmost ports in the wall of element 40 remain open with the valve in this limit position to accommodate very small gaseous flow rates.

A conventional vent plug 80 may be provided in the wall of housing 12.

*Operation*

The variable flow separtor described may be utilized for insertion into any of a great number of gas lines having different flow rates. The device is positioned generally as shown in FIG. 1 with the gas lines connecting at inlet 20 and outlet 26. Drain outlet 34 may be attached to a suitable drain line (not shown). Flowing gas is then allowed to enter through inlet means 20 where it passes down into the cylindrical element 40, and then radially outwardly through the ports 44.

If the volumetric flow rate is relatively small, the gas will flow out only the topmost ports. The gas emerging into the centrifugal separator means is given a whirling motion and passes down around baffles 60 and 62 and then through conduit 32 to the outlet. The moisture, etc., is thrown against the walls of housing 12 during the whirling movement and passes down the wall and past baffle 36 to the bottom 33. If a higher flow rate of gas passes through the line, or if the separator is to be used in a line having a constantly higher flow rate, the gas entering at inlet means 20 forces valve 42 downwardly against the biasing spring 76 due to the larger pressure differential resulting. More ports 44 are thus uncovered to create more cross sectional porting area. Spring 76 is calibrated so that the velocity of the gases emerging from porting means 44 will remain within an optimum range for most effective separation; that is, as the volumetric flow rate increases through the inlet means 20, valve 42 will move downwardly at a predetermined ratio to maintain the velocity within a predetermined optimum zone.

It will be readily seen that the illustrated structure providing accurate and automatically responsive regulating action is amenable to high speed, inexpensive manufacturing techniques. This relatively simple addition further greatly enhances the adaptability and efficiency of the separator.

Various modifications within the spirit of this invention will be apparent to those in the art. Thus, this invention is not to be limited by the form of the invention illustrated, but only by the scope of the appended claims and the reasonably equivalent structures to those defined therein.

I claim:
1. A separator for removing impurities from a gaseous carrier, comprising: an elongated housing; inlet means in one end of said housing for entrance of an impurity-laden gas; centrifugal flow separator baffles in the central portion of said housing spaced therealong, and forming annular passages therearound for the gases, causing flow around said baffles and adjacent said housing for separating said impurities from said gaseous carrier; outlet means in said housing for the gaseous carrier downstream of said baffles to exit the gaseous carrier; and gas flow regulation means positioned adjacent said inlet means upstream of said baffles; said regulation means comprising a tubular element having an inlet communicating with said inlet means and a reciprocable valve means in said element shiftable toward and away from said inlet in said element; the wall portions of said element including a plurality of outlet ports arranged generally tangentially to said element to cause circular flow from said inlet means to said separator baffles; said regulation means including biasing means operably engaged with said valve means and biasing it toward said inlet to decrease flow through said ports; and said valve means being responsive to gaseous flow through said inlet to be reciprocally shiftable within said element by the flowing gas against the force of said biasing means to allow flow of varying increasing amounts through said ports.

2. A centrifugal separator for removing impurities from a gaseous carrier comprising: an elongated generally cylindrical housing having a generally cylindrical inner wall; inlet means adjacent one end of said housing for the impurity-laden gas; gaseous outlet means adjacent the other end of said housing; impurity disposal means in said housing; baffles in said housing spaced along said elongated housing between said inlet means and outlet means and spaced from said inner housing wall to form annular passage means therearound adjacent said housing wall for guiding the gaseous flow in a centrifugal flow pattern to separate impurities from the gaseous carrier; and flow regulating means extending into said housing from said inlet means upstream of said baffle means; said regulating means comprising a hollow cylindrical ported element and a valving member reciprocable in said element along the axis of said element; said element having an open end communicating with said inlet means, with the opposite end being closed; said element having a plurality of outlet porting means arranged generally tangentially through the wall thereof and axially spaced therein to cause gas flow in a circular pattern in said housing past said baffles and thereby cause a centrifugal flow pattern between said baffles and said housing wall; spring means biasing said valving member toward said inlet to decrease flow through said porting means; and said valving member being responsive to gaseous flow through said inlet means and said open end to be variably movable against said spring bias with the dynamic pressure of an increased flow rate to permit an increased flow rate through an increased number of said ports at a substantially constant velocity.

3. The separator in claim 2 wherein said valving member is a disc that reciprocates on a central guide means.

4. The separator in claim 3 wherein said guide means includes a stop means for said spring biased valving member.

5. The separator in claim 2 wherein a portion of said baffles are secured to said cylindrical element.

References Cited by the Examiner

UNITED STATES PATENTS

| | | | |
|---|---|---|---|
| 1,548,288 | 8/25 | Smith | 55—418 |
| 1,973,258 | 9/34 | Jensen | 55—420 |
| 2,942,691 | 6/60 | Dillon | 55—391 |

FOREIGN PATENTS

| | | |
|---|---|---|
| 10,385 | 1/24 | Netherlands. |
| 127,029 | 8/28 | Switzerland. |

HARRY B. THORNTON, *Primary Examiner.*